(12) United States Patent  
Hoag

(10) Patent No.: US 6,313,848 B1
(45) Date of Patent: Nov. 6, 2001

(54) FOLDED TABLES: A METHOD OF VIEWING WIDE TABLES WITH REDUCED NEED FOR HORIZONTAL SCROLLING

(75) Inventor: LaVerne L. Hoag, Freehold, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/226,755

(22) Filed: Jan. 6, 1999

(51) Int. Cl.[7] .................................................. G06G 5/34
(52) U.S. Cl. ............................................ 345/684; 345/973
(58) Field of Search ..................................... 345/112, 115, 345/118, 121, 123, 131, 133, 334, 339–342, 358, 467, 354, 348, 302, 333; 707/509

(56) References Cited

U.S. PATENT DOCUMENTS

| | | | | |
|---|---|---|---|---|
| 5,502,805 | * | 3/1996 | Anderson et al. .................... | 345/340 |
| 5,664,127 | * | 9/1997 | Anderson et al. .................... | 345/339 |
| 5,808,914 | * | 9/1998 | Shin et al. ........................... | 707/509 |
| 5,905,476 | * | 5/1999 | McLaughlin et al. .............. | 345/123 X |
| 6,065,022 | * | 5/2000 | Ueki .................................. | 707/509 X |

\* cited by examiner

*Primary Examiner*—Matthew Luu
*Assistant Examiner*—Chanté Harrison
(74) *Attorney, Agent, or Firm*—Schnader Harrison Segal & Lewis LLP

(57) ABSTRACT

A method for displaying, in a window on a computer display screen, tabular data arranged in rows and columns, wherein the sum of the widths of the columns is greater than the width of the workspace available within the window. The method includes the steps of determining the width of each column, determining the height of each row, and determining the dynamic height and width of the workspace available for the display of tabular data within said window. The method further includes the step of dividing said tabular data into table segments, each table segment comprising one or more columns of said tabular data. The method also includes the step of dividing said workspace into panes, each pane having a height determined by dividing the height of the window by the number of table segments, and displaying within each pane all of the columns of a table segment and one or more rows, wherein different columns are displayed in each pane and the same rows are displayed in each pane.

19 Claims, 5 Drawing Sheets

| ⌸Folded Table Example | | | | | | |
|---|---|---|---|---|---|---|
| | 1. More Info? | 2. Object ID | 3. Class Name | 4. Source Object ID | 5. Severity | 6. Type |
| 1 | Map | | | | Critical | Fault |
| 2 | Map & Prop. | | | | Major | Alarm |
| 3 | None | | | | Minor | |
| 4 | | | | | Warning | |
| 5 | | | | | | |
| 6 | | | | | | |
| 7 | | | | | | |
| 8 | | | | | | |
| 9 | | | | | | |
| 10 | | | | | | |
| | 7. Time Stamp | 8. Composite: Relation | 9. Composite: Count | 10. Composite: Interval Start | 11. Composite: Interval Start | 12. Composite: Reference List |
| 1 | 6/11/98 10:36:49 | | | 6/11/98 10:36:49 | 6/11/98 11:24:05 | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |

FIG. 6 600

| | 1. More Info? | 2. Object ID | 3. Class Name | 4. Source Object ID | 5. Severity | 6. Type |
|---|---|---|---|---|---|---|
| | None | | | | Minor | |
| 3 | | | | | Warning | |
| 4 | | | | | | |
| 5 | | | | | | |
| 6 | | | | | | |
| 7 | | | | 511 | | |
| 8 | | | | | | |
| 9 | | | | | | |
| 10 | | | | | | |
| 11 | | | | | | |
| 12 | | | | | | |
| | 7. Time Stamp | 8. Composite: Relation | 9. Composite: Count | 10. Composite: Interval Start | 11. Composite: Interval Start | 12. Composite: Reference List |
| 3 | | | | | | |
| 4 | | | 512 | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |

FOLDED TABLES: A METHOD OF VIEWING WIDE TABLES WITH REDUCED NEED FOR HORIZONTAL SCROLLING

BACKGROUND OF THE INVENTION

1. Field of the Invention

This invention relates generally to methods for controlling and displaying information using computers, and more particularly, to the presentation of information in a windowing environment by program applications, particularly electronic spreadsheets and databases.

2. Description of the Prior Art

Spreadsheet and database applications allow users to view and manipulate tabular data, i.e., information organized into rows and columns. Often, the tabular data is too large to fit on the display screen. Existing applications address this problem by providing users with the ability to scroll information both vertically and horizontally. In a windowing desktop environment, such as Microsoft Windows and the like, the problem of fitting information on the screen is exacerbated, because a plurality of windows can appear on the screen simultaneously, and each window may be significantly smaller than the display screen. Furthermore, users of most windowing desktop environments may interactively or dynamically change the size of a window at any time, which may reduce the available space for displaying tabular data.

Several existing systems attempt to overcome the problem of using tables that are wider than the window space available to display them.

One prior art method, chiefly implemented in database applications rather than spreadsheet applications, is that when a record is selected for viewing or editing, it is displayed in a separate window or form. The disadvantage of this method is that only one record at a time may be viewed or edited in its entirety, and the viewing or editing window may obscure all or part of the window that displays tabular data in rows and columns.

Another prior art method, taught in U.S. Pat. No. 5,317,306, allows the user to determine which columns are most important to him or her, and to designate those columns as "sticky." When a table contains more columns of information than can be displayed simultaneously, the user must scroll horizontally to view an entire row. The "sticky" columns remain in the display window when the user enters a command for horizontal scrolling. A similar prior art method is used in Microsoft Corporation's Excel spreadsheet application, in which a user may select a row, column, or cell, and choose to "freeze panes," which splits the window, thereby causing all rows and columns above and to the left of the selected position to remain frozen in place while the rest of the display remains responsive to scrolling commands. In the prior art, a user also may make additional room in the window by designating a row or column as hidden, which suppresses its display until said row or column is unhidden by a user command.

Still another prior art method is disclosed in U.S. Pat. No. 5,621,876, which teaches a method for increasing the number of columns in the display by adding an additional column when the user selects an "increase activator" button. This method makes the window larger, if the additional column will fit on the display screen. Otherwise, it makes the other columns narrower to accommodate the additional column.

The present invention overcomes the deficiencies of existing systems by dividing the columns in a wide table into a plurality of segments, and displaying each table segment in a section or pane of the window, while making the plurality of table segments function as a single table. Visually, the effect is that of breaking the table into multiple-column segments, each of which is as wide as the display window, and displaying all segments in panes that are vertically stacked on top of each other.

It is a principal object of the present invention to allow a computer user to view an entire wide record of tabular data, displayed as a row in a single window, with reduced or eliminated need for horizontal scrolling.

It is a further object of the invention to allow the user to visually compare two or more rows at a glance, by displaying a plurality of rows in their entirety.

Further objects and advantages of this invention will become apparent from the detailed description of a preferred embodiment, which follows.

SUMMARY OF THE INVENTION

The present invention is directed to a method of operating a digital computer to display and manipulate, in a window on a display screen, tabular data arranged in rows and columns, wherein the sum of the widths of the columns is greater than the width of the workspace available within the window. The method includes the steps of determining the width of each column, determining the height of each row, and determining the dynamic height and width of the workspace available for the display of tabular data within said window. The method further includes the step of dividing said tabular data into table segments, each table segment comprising one or more columns of said tabular data. The method also includes the step of dividing said workspace into panes, each pane having a height determined by dividing the height of the window by the number of table segments, and displaying within each pane all of the columns of a table segment and one or more rows, wherein different columns are displayed in each pane and the same rows are displayed in each pane.

BRIEF DESCRIPTION OF THE DRAWINGS

Other features and advantages of the present invention will be described in further detail with reference to the accompanying drawings. The figures of the accompanying drawings illustrate the present invention by way of example and not limitation.

FIG. 5 shows a window implementing the present invention, displaying exemplary tabular data in two table segments, with no need for horizontal scrolling.

FIG. 6 illustrates vertical scrolling applied to the window of FIG. 5, displaying additional rows of tabular data.

DETAILED DESCRIPTION OF THE INVENTION AND THE PREFERRED EMBODIMENTS

Figure 1:
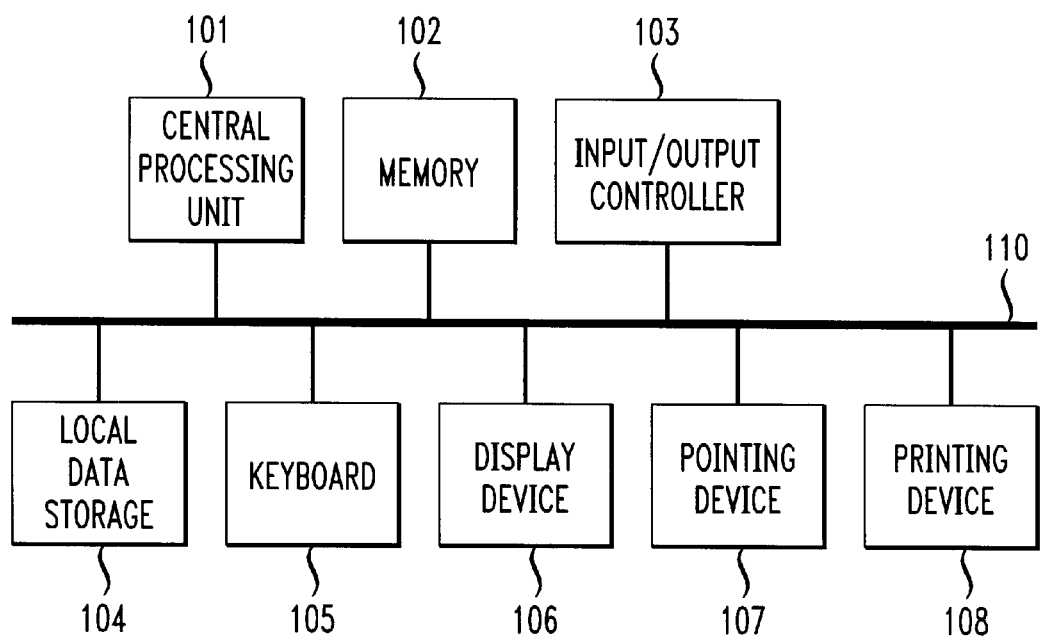
FIG. 1 is a block diagram of a computer system in which the present invention may be embodied.

As shown in FIG. 1, the present invention may be embodied on a computer system such as the system 100, which comprises a central processing unit 101 (e.g., one or more Pentium II processors, available from Intel Corporation), memory 102, an input/output controller 103, one or more local data storage devices 104 (e.g., hard disk, CD-ROM), a keyboard 105, and a display device 106. Additional input/output devices, such as a pointing device 107 (e.g., mouse, trackball, pen device, or the like), and a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM Corporation).

Figure 2:
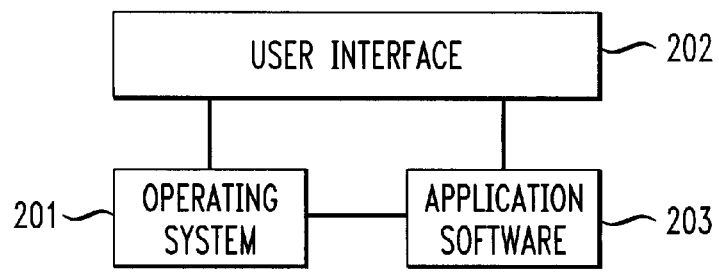
FIG. 2 is a block diagram of a computer software system of the present invention, which includes operating system, application software, and user interface components.

As shown in FIG. 2, a computer software system 200 is provided for directing the operation of the computer system 100. Computer software system 200, which is stored in memory 102 and on local data storage device 104, includes an operating system 201 and a user interface 202. One or more application programs, such as application software 203, may be transferred from data storage 104 into memory 102 for execution by the system 100. User interface 202, which is preferably a graphical user interface (GUI), processes user commands from keyboard 105 and pointing device 107, and displays results upon display device 106. In response to user commands that system 100 receives through user interface 202, the system 100 acts in accordance with instructions from operating system 201 and/or application software 203. In a preferred embodiment, operating system 201 and user interface 202 are both components of Windows 95, available from Microsoft Corporation. Application module 203 includes a spreadsheet or database application applying the present invention, as described in further detail herein.

Figure 3:
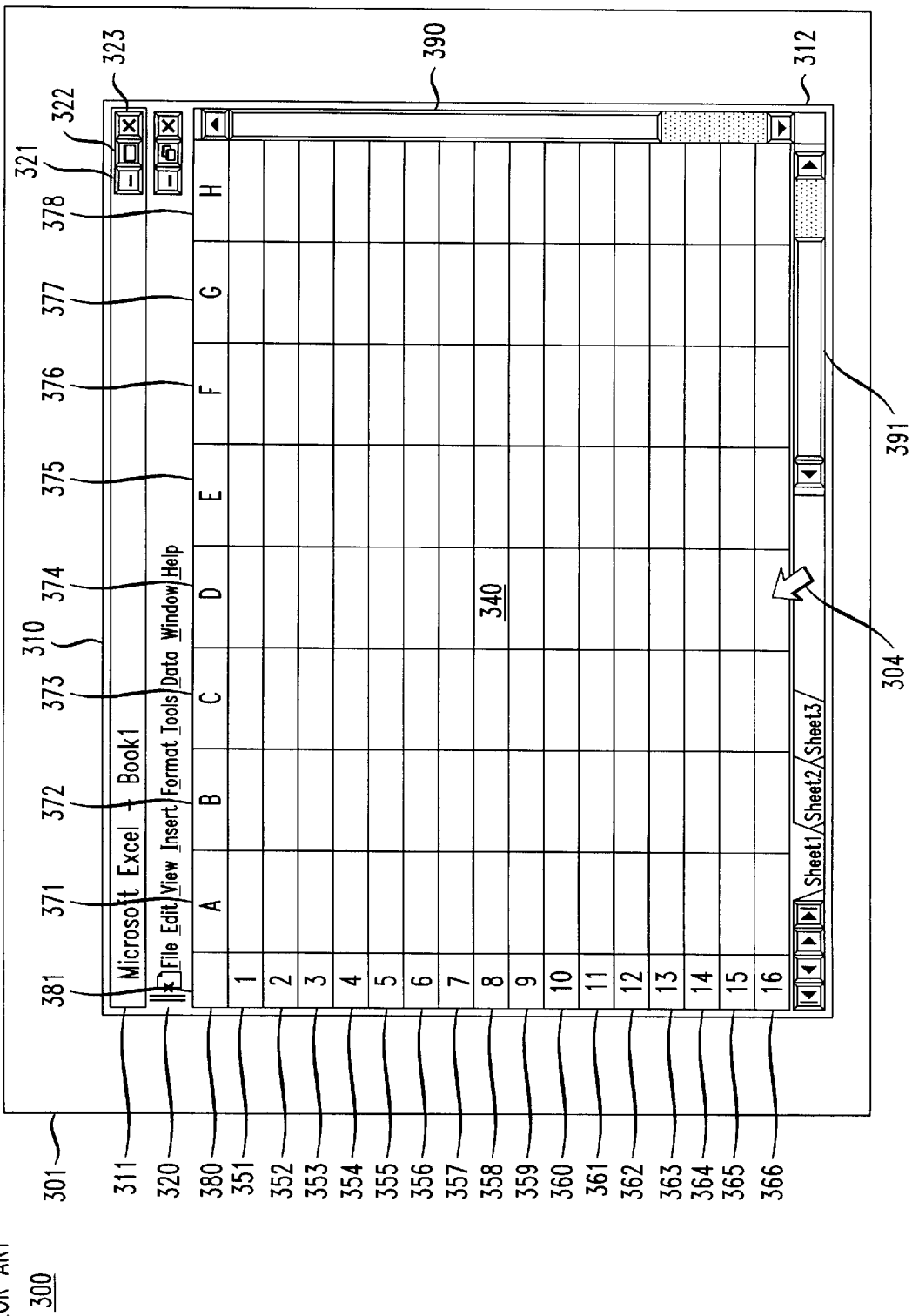
FIG. 3 shows the display screen of a digital computer, including a window that displays tabular data in a spreadsheet application.

Referring now to FIG. 3, the system 100 and the user interface 202 include a windowing environment 300. Desktop 301 is rendered visible on display 106 by user interface 202. In a preferred embodiment, desktop 301 is the Windows 95 desktop.

Windowing environment 300 also includes a screen cursor 304, used to select and operate on objects of interest. In response to user movement signals from the pointing device 107, the cursor 304 moves across the display 106 to a desired screen location. During or after cursor movement, the user may generate user-event signals (e.g., by clicking a mouse button, or by dragging an object on the desktop while the mouse button is depressed) for the purpose of selecting and manipulating objects, as is known in the art.

Desktop 301 may display a plurality of windows such as window 310. Displayed in window 310 is a software application 203, which is identified by name in title bar 311. The example shown is Microsoft Excel, a prior art spreadsheet application.

The size of window 310 may be changed by using pointing device 107 to drag an edge or corner of frame 312, so as to reposition the edge or corner to a new position on desktop 301. At the top of window 310 is a menu bar 320 with a plurality of user-command choices, each of which may invoke additional submenus and software tools for use with application objects. Window 310 may be minimized by clicking on box 321, maximized by clicking on box 322, or closed by clicking on box 323.

Workspace 340 is the available space in the window for displaying and manipulating data. Workspace 340 functions essentially as a viewport in which the user interacts with data objects that reside within the computer system 100. Illustrated in workspace 340 is a conventional prior art spreadsheet in which tabular data is displayed in rows 351–366 and columns 371–378. The header row 380 displays column labels (showing columns designated by letters A through H) for each visible column, and the header column 381 displays row labels for each visible row (showing rows designated by numbers 1 through 16). Workspace 340 extends from the top left corner at the intersection of header row 380 and header column 381 to the bottom right corner at the intersection of the last displayed row 366 and the last displayed column 378. The information shown in workspace 340 may be scrolled in response to user commands such as dragging or clicking vertical scroll bar 390 or horizontal scroll bar 391, so that additional rows or columns not shown in FIG. 3 will be displayed in workspace 340.

Figure 4:
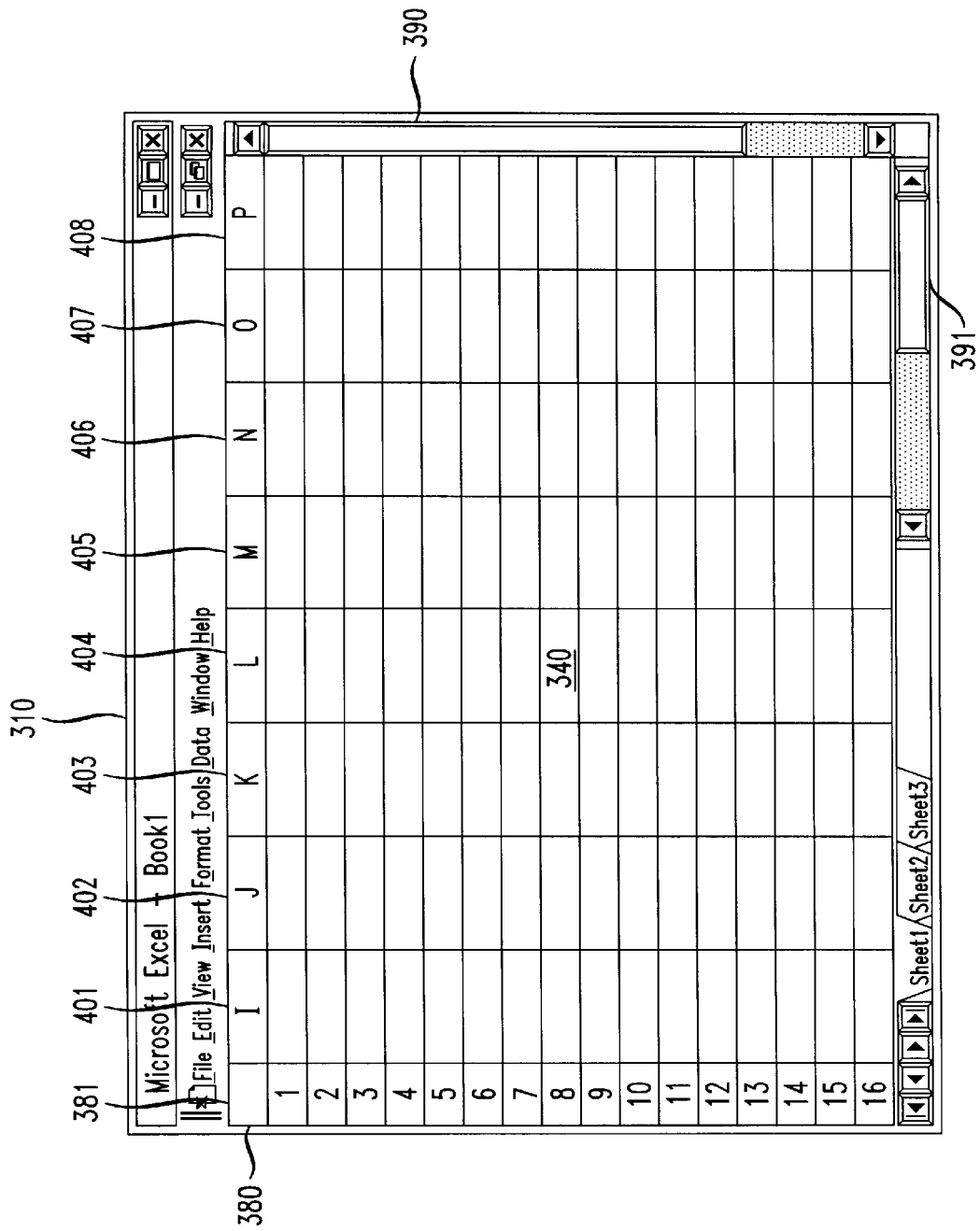
FIG. 4 illustrates prior art horizontal scrolling applied to the window of FIG. 3, displaying additional columns of tabular data.

FIG. 4 illustrates a prior art method of displaying additional columns of tabular data. When horizontal scroll bar 391 is activated by a user command to scroll eight columns to the right, window 310 displays the result. The header row 380 displays column labels for each visible column, and the header column 381 displays row labels for each visible row. The updated column labels (showing columns designated by letters I through P) in header row 381 indicate that additional columns 401-408 are displayed, but columns 371–378 (FIG. 3), which precede column 401 in sequence, are no longer visible because they have scrolled outside of the workspace 340.

In contrast to conventional methods, the present invention allows the user to see more columns of tabular data within a display window. In many cases, all columns will be visible at once, eliminating the need for horizontal scrolling.

Shown in FIG. 5, an exemplary embodiment of the present invention will now be described, illustrating an implementation of folded tables for an exemplary collection of tabular data comprising twelve columns and a plurality of rows in excess of twelve rows. However, tabular data may comprise any positive number of columns and any positive number of rows. Displayed in window 500 is a software application 203 (FIG. 2) implementing the present invention. Application 203 is identified by name in title bar 311.

Workspace 340 is the available space in window 500, comprising the rectangular space that is within the boundaries of window 500, but that excludes any space that is used by such elements as frames, title bars, menu bars, scroll bars, toolbars, and the like, if present. Workspace 340 extends from the top left corner at the intersection of header row 520 and header column 522 to the bottom right corner at the intersection of the last displayed row and the last displayed column. If the width of workspace 340 is smaller than the sum of the widths of all columns plus the width of the header column, one or more dividing lines 510 divide workspace 340 into a plurality of panes, e.g., pane 511 and pane 512.

Pane 511 displays the first table segment, comprising the first group of columns in sequence that will fit in the width of workspace 340. Pane 512 displays the second table segment, comprising the remaining columns in sequence that will fit in the width of workspace 340. Each pane has a height determined by dividing the height of workspace 340 by the number of table segments. The number of panes and dividing lines depends upon the number of columns, the width of each column, and the width of the available space.

A header row 520 displays column labels for the first table segment. A header row 521 displays column labels for the second table segment. A header column 522 is displayed within pane 511, displaying row labels (showing rows designated by numbers 1 through 10) for each visible row in pane 511. A header column 523 is displayed within pane 512, displaying row labels (showing rows designated by numbers 1 through 10) for each visible row in pane 512. The fact that the row labels in header column 523 are duplicates of the row labels in header column 522 illustrates that pane 511 and pane 512 are displaying different columns of the same rows.

Within each pane 511, a header row 520 is displayed, and every row that is not designated as hidden is displayed if it will fit completely or partially within the height of the pane. In a preferred embodiment, if a row will only partially fit within the height of each pane, the row may be either excluded or partially displayed in each pane. If there are more rows than can be completely displayed within the height of each pane 511, the width of workspace 340 is reduced to accommodate a vertical scroll bar 390.

Given the width of each column, and excluding hidden columns that the user has chosen not to display, the present invention divides the tabular data into table segments by fitting as many columns as possible into the width of the workspace 340 (which represents the available space in window 500), and dividing workspace 340 vertically into a plurality of panes (such as pane 511 and pane 512), if needed to display additional columns. Header columns (such as 522 and 523) are displayed in each pane. The present invention iterates through every non-hidden column in sequence, adding the column to the current table segment if the column will fit, and creating a new table segment and corresponding pane if the column will not fit.

FIG. 6 illustrates the result of a user command to display two additional rows of tabular data. When vertical scroll bar 390 is activated by a user command to scroll down, window 600 displays the result. Header rows 520 and 521 display the column labels for both table segments, unchanged from their appearance in window 500, illustrating that for each row displayed in window 600, all of the columns are shown. Header columns 522 and 523 display row labels for each visible row. The updated row labels (showing rows designated by numbers 3 through 12) illustrate that pane 511 and pane 512 have scrolled in synchronization with each other, so that the same rows are shown in each pane.

There are numerous user commands in the prior art that relate to information displayed in the form of rows and columns in a spreadsheet, database, or similar software application. A preferred embodiment of the present invention is adapted to respond to any such command. When a user command is given that relates to a given row, a preferred embodiment of the present invention adapts the result of such a command to the folded tables system by implementing and displaying the result in every pane that displays the given row. For example, if a user command is received to change the height of a given row, the present invention will change the height of the row in every pane, and will redisplay all the rows or partial rows that will fit within the height of each pane. If a user command is received to select, cut, copy, paste, delete, hide, or unhide a given row, the present invention will perform that command on the given row in every pane, and will recalculate and/or redraw the window, if necessary.

The features of the present invention have been illustrated with a single standalone computer. However, those skilled in the art will appreciate that the present invention may be implemented on one or more computers connected to a network (including local area networks, wide area networks, and the Internet), so that data storage, computational functions, and user interface and display functions may be implemented on a plurality of interconnected computers. The present invention may be advantageously implemented in a variety of graphical user interface platforms including all versions of Microsoft Windows, and others such as Motif, NextStep, OS/2, Macintosh Finder, X Windows, K Desktop Environment, and the like. Furthermore, the present invention may be implemented in a variety of programming languages including Java and C++ (each available in development platforms from companies including Microsoft Corp., Borland International, and Symantec), and the like, or in the form of software components such as Visual Basic extensions, ActiveX controls, Java Beans, and the like.

What have been described are only some examples of methods and systems according to the invention. Accordingly, it is to be understood that various and numerous other arrangements may be devised by one skilled in the art without departing from the spirit and scope of the invention as limited only by the accompanying claims.

What is claimed is:

1. A method of operating a digital computer to display and manipulate, in a window on a display screen, tabular data arranged in rows and columns, wherein the sum of the widths of the columns is greater than the width of the workspace available within the window, said method comprising the computer-implemented steps of:
   a. determining the width of each column;
   b. determining the height of each row;
   c. determining the dynamic height and width of the workspace available for the display of tabular data within said window;
   d. dividing said tabular data into table segments, each table segment comprising one or more columns of said tabular data;
   e. dividing said workspace into panes, each pane having a height determined by dividing the height of the window by the number of table segments;
   f. displaying within each pane all of the columns of a table segment and one or more rows, wherein different columns are displayed in each pane and the same rows are displayed in each pane.

2. The method of claim 1 wherein said tabular data is stored in local data storage.

3. The method of claim 1 wherein said tabular data is stored in networked data storage.

4. A method of operating a digital computer to display and manipulate, in a window on a display screen, tabular data arranged in rows and columns, wherein the sum of the widths of the columns is greater than the width of the workspace available within the window, said method comprising the computer-implemented steps of:
   a. determining the width of each column;
   b. determining the height of each row;
   c. determining the dynamic height and width of the workspace available for the display of tabular data within said window;
   d. dividing said tabular data into table segments, each table segment comprising one or more columns of said tabular data;
   e. dividing said workspace into panes, each pane having a height determined by dividing the height of the window by the number of table segments;
   f. displaying within each pane all of the columns of a table segment and one or more rows, wherein different columns are displayed in each pane and the same rows are displayed in each pane;

wherein said tabular data is stored in networked data storage; and wherein said networked data is stored on a server which is accessed over the Internet.

5. A method of operating a digital computer to display and manipulate, in a window on a display screen, tabular data arranged in rows and columns, wherein the sum of the widths of the columns is greater than the width of the workspace available within the window, said method comprising the computer-implemented steps of:
 a. determining the width of each column;
 b. determining the height of each row;
 c. determining the dynamic height and width of the workspace available for the display of tabular data within said window;
 d. dividing said tabular data into table segments, each table segment comprising one or more columns of said tabular data;
 e. dividing said workspace into panes, each pane having a height determined by dividing the height of the window by the number of table segments;
 f. displaying within each pane all of the columns of a table segment and one or more rows, wherein different columns are displayed in each pane and the same rows are displayed in each pane;
wherein the step of dividing tabular data into table segments includes the steps of:
 a. creating a table segment comprising the first non-header, non-hidden column;
 b. iteratively adding each additional non-hidden column in sequence to the most recently created table segment, if adding said additional column to the most recently created table segment would not cause the sum of the widths of all columns in the most recently created table segment plus the width of the header column to exceed the width of the workspace; otherwise, creating a new table segment and adding said additional column to the newly created table segment.

6. A method of operating a digital computer to display and manipulate, in a window on a display screen, tabular data arranged in rows and columns, wherein the sum of the widths of the columns is greater than the width of the workspace available within the window, said method comprising the computer-implemented steps of:
 a. determining the width of each column;
 b. determining the height of each row;
 c. determining the dynamic height and width of the workspace available for the display of tabular data within said window;
 d. dividing said tabular data into table segments, each table segment comprising one or more columns of said tabular data;
 e. dividing said workspace into panes, each pane having a height determined by dividing the height of the window by the number of table segments;
 f. displaying within each pane all of the columns of a table segment and one or more rows, wherein different columns are displayed in each pane and the same rows are displayed in each pane;
wherein the step of dividing said workspace into panes further includes, if there are more rows than will completely fit in each pane, displaying a vertical scroll bar along the right edge of the window, and reducing the width of said workspace by the width of said vertical scroll bar.

7. A method of operating a digital computer to display and manipulate, in a window on a display screen, tabular data arranged in rows and columns, wherein the sum of the widths of the columns is greater than the width of the workspace available within the window, said method comprising the computer-implemented steps of:
 a. determining the width of each column;
 b. determining the height of each row;
 c. determining the dynamic height and width of the workspace available for the display of tabular data within said window;
 d. dividing said tabular data into table segments, each table segment comprising one or more columns of said tabular data;
 e. dividing said workspace into panes, each pane having a height determined by dividing the height of the window by the number of table segments;
 f. displaying within each pane all of the columns of a table segment and one or more rows, wherein different columns are displayed in each pane and the same rows are displayed in each pane;
wherein the step of displaying within each pane all of the columns of a table segment and one or more rows includes the steps of:
 a. if one column has been designated as a header, displaying said header as the first column of each pane;
 b. if one row has been designated as a header, displaying said header as the first row of each pane;
 c. for each pane, displaying each row that is not designated a header and is not designated hidden, if said row will fit within the remaining height of each pane.

8. A method of operating a digital computer to display and manipulate, in a window on a display screen, tabular data arranged in rows and columns, wherein the sum of the widths of the columns is greater than the width of the workspace available within the window, said method comprising the computer-implemented steps of:
 a. determining the width of each column;
 b. determining the height of each row;
 c. determining the dynamic height and width of the workspace available for the display of tabular data within said window;
 d. dividing said tabular data into table segments, each table segment comprising one or more columns of said tabular data;
 e. dividing said workspace into panes, each pane having a height determined by dividing the height of the window by the number of table segments;
 f. displaying within each pane all of the columns of a table segment and one or more rows, wherein different columns are displayed in each pane and the same rows are displayed in each pane;
wherein the step of displaying within each pane all of the columns of a table segment and one or more rows includes the steps of:
 a. if one column has been designated as a header, displaying said header as the first column of each pane;
 b. if one row has been designated as a header, displaying said header as the first row of each pane;
 c. for each pane, displaying each row that is not designated a header and is not designated hidden, if said row will fit within the remaining height of each pane; and
wherein a row that will partially fit within the remaining height of each pane is partially displayed in each pane.

9. A method of operating a digital computer to display and manipulate, in a window on a display screen, tabular data arranged in rows and columns, wherein the sum of the widths of the columns is greater than the width of the workspace available within the window, s a id method comprising the computer-implemented steps of:

a. determining the width of each column;

b. determining the height of each row;

c. determining the dynamic height and width of the workspace available for the display of tabular data within said window;

d. dividing said tabular data into table segments, each table segment comprising one or more columns of said tabular data;

e. dividing said workspace into panes, each pane having a height determined by dividing the height of the window by the number of table segments;

f. displaying within each pane all of the columns of a table segment and one or more rows, wherein different columns are displayed in each pane and the same rows are displayed in each pane;

wherein the step of displaying within each pane all of the columns of a table segment and one or more rows includes the steps of:

a. receiving a user command to scroll vertically in a specified direction;

b. determining if the panes can be scrolled in the specified direction;

c. if the direction of scroll is upward, then for each pane, and for each displayed row that is not designated a header or hidden, displaying in place of said row the sequentially following row that is not designated a header or hidden, if it will fit within the height of the pane; and d. if the direction of scroll is downward, then for each pane, and for each displayed row that is not designated a header or hidden, displaying in place of said row the sequentially preceding row that is not designated a header or hidden, if it will fit within the height of the pane.

10. The method of claim 1 wherein the step of displaying within each pane all of the columns of a table segment and one or more rows includes the steps of:

a. receiving a user command to change the height of a given row;

b. for each pane that displays said row, changing the height of said row, and redisplaying the rows or partial rows that will fit within the height of each pane.

11. The method of claim 1 wherein the step of displaying within each pane all of the columns of a table segment and one or more rows includes the steps of:

a. receiving a user command to select a given row;

b. for each pane that displays said row, selecting said row.

12. The method of claim 1 wherein the step of displaying within each pane all of the columns of a table segment and one or more rows includes the steps of:

a. receiving a user command to cut a given row;

b. for each pane that displays said row, cutting said row.

13. The method of claim 1 wherein the step of displaying within each pane all of the columns of a table segment and one or more rows includes the steps of:

a. receiving a user command to copy a given row;

b. for each pane that displays said row, copying said row.

14. The method of claim 1 wherein the step of displaying within each pane all of the columns of a table segment and one or more rows includes the steps of:

a. receiving a user command to paste at a given row;

b. for each pane that displays said row, pasting at said row.

15. The method of claim 1 wherein the step of displaying within each pane all of the columns of a table segment and one or more rows includes the steps of:

a. receiving a user command to delete a given row;

b. for each pane that displays said row, deleting said row.

16. The method of claim 1 wherein the step of displaying within each pane all of the columns of a table segment and one or more rows includes the steps of:

a. receiving a user command to hide a given row;

b. designating said row as hidden;

c. for each pane that displays said row, hiding said row.

17. The method of claim 1 wherein the step of displaying within each pane all of the columns of a table segment and one or more rows includes the steps of:

a. receiving a user command to unhide a given row;

b. if said row is designated as hidden, removing from said row its designation as hidden, and for each pane that displays a row adjoining said row, displaying said row.

18. A computer programmed to operate the method of claim 1.

19. Magnetic media on which is recorded a program adapted to operate a computer according to the method of claim 1.

* * * * *